H. E. WILLIAMS.
BEET TOPPER AND HARVESTER.
APPLICATION FILED NOV. 19, 1912.
1,099,414.
Patented June 9, 1914.
4 SHEETS—SHEET 3.
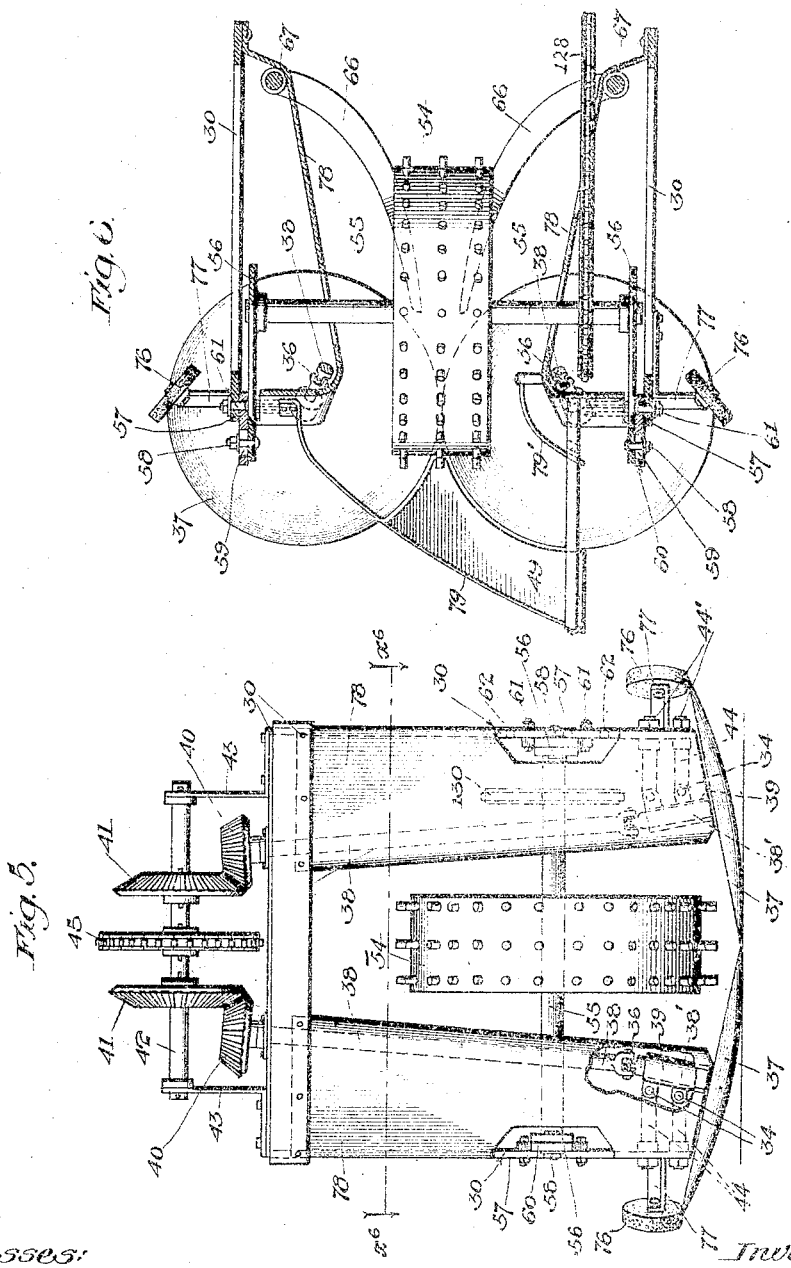

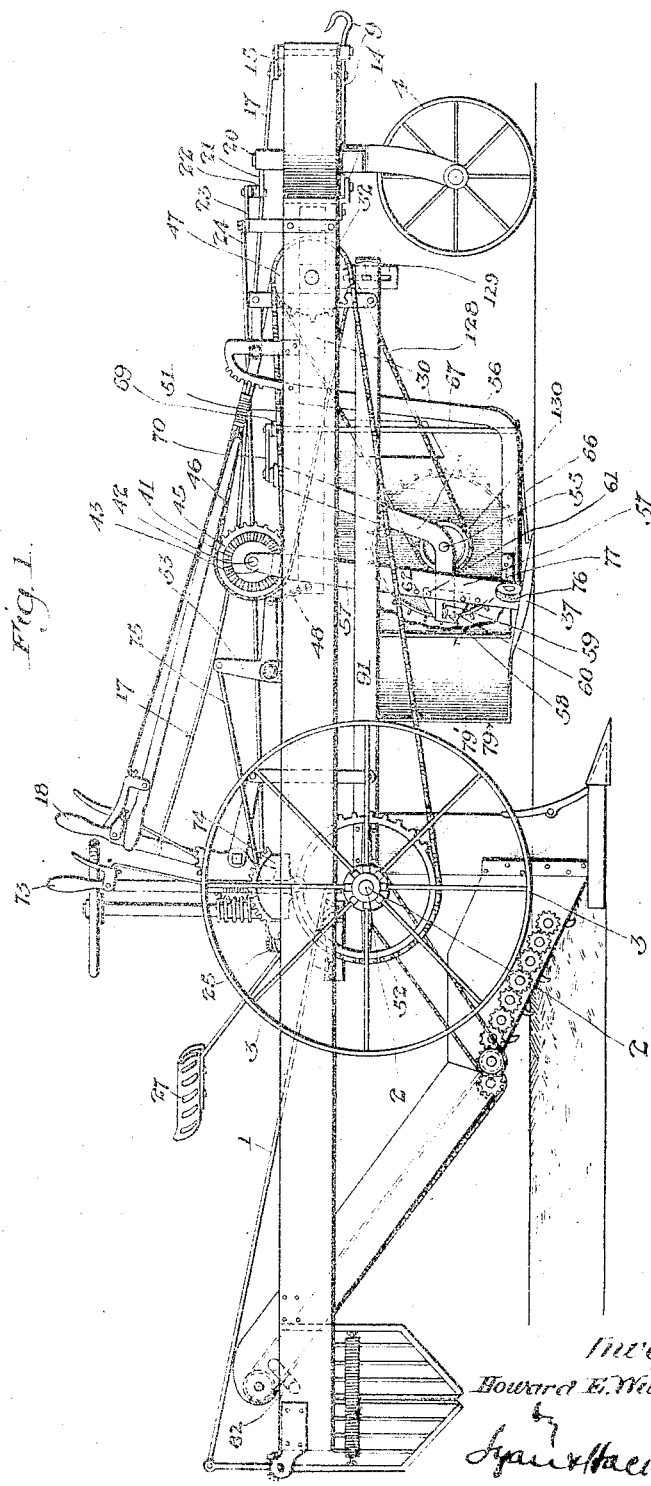

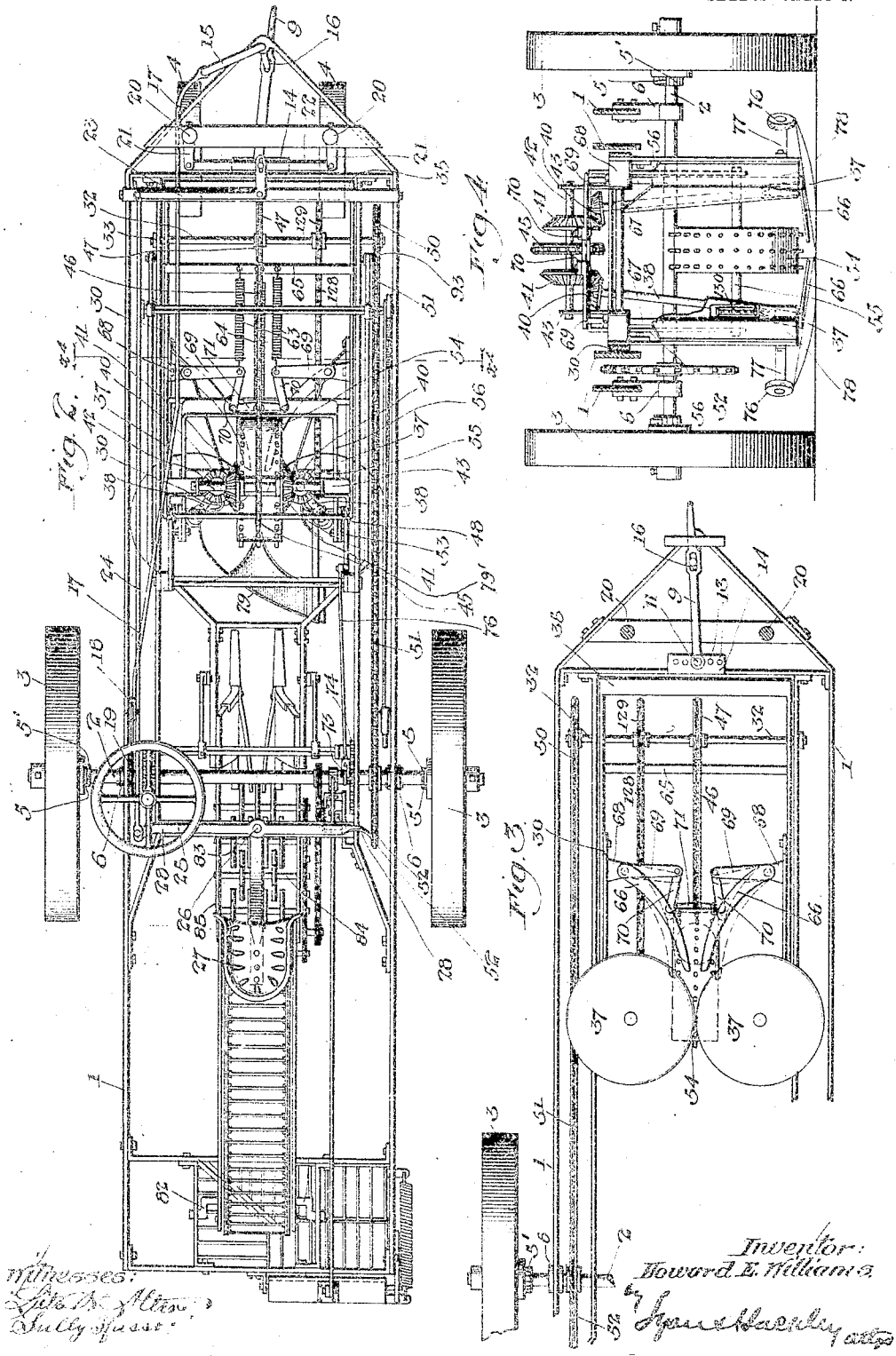

H. E. WILLIAMS.
BEET TOPPER AND HARVESTER.
APPLICATION FILED NOV. 19, 1912.
1,099,414.
Patented June 9, 1914.
4 SHEETS—SHEET 4.
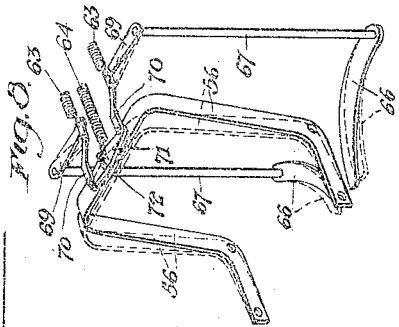
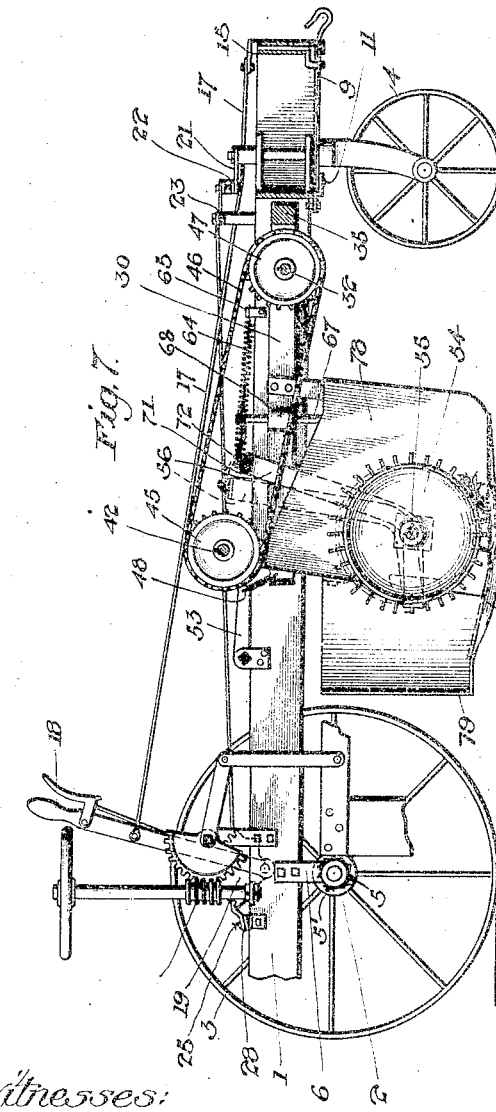

UNITED STATES PATENT OFFICE.

HOWARD E. WILLIAMS, OF COMPTON, CALIFORNIA.

BEET TOPPER AND HARVESTER.

1,099,414.

Specification of Letters Patent.   Patented June 9, 1914.

Application filed November 19, 1912. Serial No. 732,387.

*To all whom it may concern:*

Be it known that I, HOWARD E. WILLIAMS, a citizen of the United States, residing at Compton, in the county of Los Angeles and State of California, have invented a new and useful Beet Topper and Harvester, of which the following is a specification.

This invention relates to a machine for topping beets and the main object of the invention is to provide a beet topper in which the cutters for severing the beet tops are so guided as to automatically adjust themselves to the height and size of the beets.

A further object of the invention is to provide for forcing and holding the beet tops in position to be effectively operated upon by the cutters.

Another object of the invention is to provide for throwing the severed tops away from the beets so as to leave a clear path for the pulling operation.

Other objects of the invention will appear hereinafter.

The accompanying drawings illustrate an embodiment of the invention, and referring thereto: Figure 1 is a side elevation of the machine. Fig. 2 is a plan thereof. Fig. 3 is an inverted plan of the forward portion of the machine. Fig. 4 is a section on line $x^4$—$x^4$ in Fig. 2. Fig. 5 is a rear view of the cutting devices. Fig. 6 is a section on line $x^6$—$x^6$ in Fig. 5. Fig. 7 is a central longitudinal section of the forward portion of the machine. Fig. 8 is a perspective view of the supporting means for the cutter.

The machine is provided with a frame 1, mounted on rear wheels 3 and forward wheels 4 so as to be movable over the field, said rear wheels being preferably rotatively mounted on a shaft 2 and connected thereto by pawl and ratchet means 5, 5′, so as to cause the shaft to turn with the wheels in the forward movement of the machine, but allow the wheels to turn without turning the shaft in backward movement of the machine. The shaft 2 is rotatably mounted in bearings 6 in the frame 1 and is connected to positively drive the cutting devices hereinafter described. At its forward end the frame 1 is provided with means for enabling the machine to be drawn forward, said means consisting, for example, of a draft bar 9, adapted to connect any suitable draft means such as the doubletree of a team or the coupling of a traction engine, said draft bar 9 being swingingly connected to the frame by a bolt 11, inserted in any one of the series of perforations 13 on a plate 14 on the frame 1. A lever 15 pivoted on the frame 1 engages in a slot 16 in the draft bar 9 and is connected by a rod 17 to a lever 18 mounted on the frame 1, a segment rack 19 being provided to hold said lever 18 in any desired position, whereby the draft bar 9 may be held at any desired angular position so as to control the line of draft. The forward wheels 4 are mounted on the frame 1 by swivel supports 20 having arms 21 connected together by a cross bar 22 and a lever 23 pivoted on the frame 1 is connected to said cross bar and to a rod 24 which is connected to a steering lever 25 mounted on the frame 1 in position to be operated by the driver of the machine. Said steering lever 25 is preferably adapted to be operated by the feet of the driver, said lever being pivoted at 26 on the frame 1 directly in front of the driver's seat 27, and having portions 28 at each side adapted to be engaged by the driver's feet.

The cutting devices are mounted in a frame 30 which is mounted on the frame 1 to swing in a vertical plane, said frame 30 being U-shaped and having its side bars pivotally mounted on a cross shaft 32 extending transversely of the frame 1 and journaled in bearings 33 in said frame. The side bars of the frame 30 are extended forwardly of said supporting shaft 32 and a counter-weight 35 is connected to said side bars, forwardly of said shaft so as to counter-balance the weight of the cutting devices to any desired extent. The cutting devices comprise cutters for severing the beet tops, and a presser member for engaging with the beet tops to hold the same back against the cutters and to determine the height of the cutters. The cutters 37 consist of disks, preferably dished and having sharp cutting edges acting as circular knives, said cutters being mounted on shafts 38 extending vertically and journaled in the frame 30. Said shafts carry bevel pinions 40 at their upper ends engaged by bevel wheels 41 on a transverse shaft 42 journaled in bearings 43 on frame 30, said shaft 42 carrying a sprocket wheel 45 connected by a chain 46 with a sprocket wheel 47 on the supporting shaft 32 of frame 30. Said shaft 32 also carries a sprocket wheel 50 connected by a chain 51 with a sprocket wheel 52 on the shaft 2 for the running wheels 3, so that in the forward operation of said running wheels, the cutters will be positively rotated and the proportions and relations of the aforesaid gear connections are such that the cutting edges of the cutters are driven rearwardly at a speed considerably greater than the forward movement of the machine so that the said cutting edges have a direct draw-cutting action on the beet tops.

The presser member is shown as a wheel or roller 54 carried by a shaft 55 journaled in a frame 56 which is pivotally mounted at 58 on bars 57 depending vertically from the frame 30, said bars 57 carrying the lower bearings for the cutter shafts 38. To enable adjustment of the pivotal parts of the frame 56, the pivots 58 thereof are adjustably mounted in slots 59 in brackets 60 which may be bolted at any desired height on the bars 57 by bolts 61 engaging in bolt holes 62 in said bars. A spring 64 is connected to the frame 56 aforesaid and to a cross bar 65 on frame 30 tending to hold the frame 56 downwardly so as to cause the presser wheel or roller 54 to bear on the beet tops with a yielding pressure, said spring being of sufficient strength to cause the frame 30 and the parts carried thereby to be lifted as a whole when the presser wheel or roller 54 is lifted, but enabling said presser wheel to yield independently of the frame 30 under certain conditions, as hereinafter set forth. Such independent movement of the presser wheel and its carrying frame 56 is effected by controlling arms 66 carried by shafts 67 extending vertically and journaled in bearings 68 on the frame 30, said shafts being provided with arms 69 at their upper ends, connected by links 70 to an equalizing lever 71 which is pivoted at 72 on the presser wheel frame 56, so that either of said controlling arms in moving laterally, tends to move the other arm in the same direction, but when each of said arms is moved simultaneously in opposite directions, for example in being forced outward by engaging with a large beet, they will operate through the equalizing lever 71 to turn the frame 56 rearwardly on its pivotal supports 58 and elevate the presser wheel with relation to the cutters. Springs 63 connected to the respective arms 69, and to cross bar 65, tend to hold the equalizing lever 71 and arms 66 in normal position, in which said arms have their rear ends close together and directly in front of the point of contact of the cutters, the arms being curved or inclined inwardly toward the rear to form a converging guide for engaging the beets. Means are provided for lifting the frame 30 and the cutting devices carried thereby bodily off the ground, for example, when the machine is to be moved over the field without cutting, such means comprising a lifting lever 73 with a controlling segment rack 74 and operating through rod 75, a bell crank 53 connected by chain 48 with the rear end of frame 30. Cutters 37 preferably contact at their edges only, and to keep them in sharp condition, grinding means 76 such as emery wheels, are preferably provided, mounted on brackets 77 on frame 30, such wheels engaging frictionally with the disks and rotated thereby.

Walls or shields 78 are provided at each side of the presser wheel, said walls converging rearwardly to guide the beet tops under the presser wheel. Deflectors 79, 79' are provided at the rear of the cutters, curved or bent to one side so as to form a passage for throwing or guiding the severed tops to that side, this passageway having a bottom 49. The cutters 37 are preferably mounted on shafts 38 by a universal joint 36 connecting each shaft 38 with a shaft 38', carrying the corresponding cutter, and shaft 38' being journaled in a bearing 39 which is supported on the frame bars 57 by bolts 44 extending through said frame bars and clamped thereto by nuts 44', said bolts being pivotally connected at 34 to the said bearing 39 for the shaft 38', so that the cutters can be adjusted inwardly or outwardly with relation to each other, and can be tipped more or less as required. A chain 128 running on sprocket wheels 129, 130 respectively on shafts 32 and 55 serves to drive the wheel 54.

In connection with the above described beet topping means, I have shown beet pulling means located at the rear of the beet topping means, said beet pulling means being, however, not here claimed or specifically described, as they form no part of my present invention.

The operation is as follows: The machine is drawn over the ground by any suitable traction means, and the operator or driver seated upon the seat 27, manipulates the steering lever 25 and the land or draft lever 18 so as to guide the machine in such manner as to cause the wheel or roller 54 to travel as nearly as possible, directly over the line of beets. Said wheel is rotated by its driving connections from the axle or shaft 2 of the machine in such manner that the forward portion of the wheel moves rearwardly faster than the machine is moving forward, whereby the beets are pressed and held back into contact with the cutters as the cutters move forward. At the same time, the cutters are rotated by the driving connections above described, so as to have a positive rearward motion relatively to the beet at the cutting point, producing a sliding or draw-cut. In passing over the beets, the height of the cutters is regulated in correspondence with the height of the beets by the action of the wheel or roller 54 riding over the tops of the beets and lifting or lowering the cutter frame 30 bodily in correspondence with the vertical movement of said wheel or roller, so that other things being equal, a high beet is cut off at a greater height than a lower beet, the tendency being, with beets of the same diameter, to cut off the beets at a uniform distance below the tops. In case however, the beet to be topped is of extra large diameter, it is desirable to lower the cut somewhat so as to remove more of the top, and this controlling operation is performed by operation of the arms 66 which, engaging with the sides of the beet, are spread apart by a wide beet, and act through their shafts 67, arms 69, links 70 and equalizing lever 71, to turn the presser frame 56 rearwardly on its pivots 58, so as to lower the cutters relatively to the presser wheel or roller. It will be noted that in case of a smaller beet located somewhat to one side of the line of draft, the action on the arms 66 will be such as to cause both of said arms to swing to one side, causing the equalizing lever 71 to turn on its pivot without effecting movement of the frame 56, so that deviation of the beets from a straight line will not affect the vertical position of the cutters. The tops which are severed in this manner are swept or thrown into and through the passageway between the deflectors 79, 79′ by the combined action of the wheel or roller 54, and of the cutters and are ejected at one side of the machine, leaving the line of topped beets clear for operation of the pulling means.

What I claim is:

1. In a beet topping machine, the combination of a frame, cutters drawn by said frame, height regulating means for said cutters, adapted to run on top the beets, means connecting said cutters with the height regulating means to raise and lower the cutters with the height regulating means, and means adapted to engage the beet for operating said connecting means to lower the cutters relatively to said height regulating means in correspondence with the dimensions of the beet.

2. In a beet topping machine, the combination of a frame, cutters drawn by said frame, height regulating means for said cutters adapted to run on top the beets, means connecting said cutters with the height regulating means to raise and lower the cutters with the height regulating means, and means for operating said connecting means to lower the cutters relatively to said height regulating means, said lowering means for the cutters comprising means for engaging with the side of the beet and controlling the connections between the cutters and the height regulating means.

3. In a beet topping machine, the combination of a machine frame, a cutter frame connected to said machine frame and movable vertically thereon, cutter means carried by said cutter frame, a regulating frame movably mounted on said cutter frame, height regulating means carried by said regulating frame, spring means connecting said regulating frame with said cutter frame to cause said frames to move together to raise the cutter means in correspondence with the height regulating means, arms movably mounted on said cutter frame and adapted to engage with opposite sides of the beets, and connections between said arms and said regulating frame to lower the cutter frame relatively to the height regulating means when the said arms are spread apart.

4. In a beet topping machine, the combination of a machine frame, a cutter frame connected to said machine frame and movable vertically thereon, cutter means carried by said cutter frame, height regulating means carried by said regulating frame, spring means connecting said regulating frame with said cutter frame to cause said frames to move together to raise the cutter means in correspondence with the height regulating means, arms mounted to move independently on said cutter frame and adapted to engage with opposite sides of the beets, and connections between said arms and said regulating frame to lower the cutter frame relatively to the height regulating means when the said arms are spread apart, comprising an equalizing lever connected to said arms and to said regulating frame, and spring means connected to said equalizing lever to hold the same in normal position.

5. In a beet topping machine, the combination of a frame, cutters drawn by said frame, height regulating means for said cutters adapted to run on top of the beets, means connecting said cutters with the height regulating means to raise and lower the cutters with the height regulating means, and means for operating said connecting means to lower the cutters relatively to said height regulating means, said lowering means for the cutters comprising independently movable means for engaging with opposite sides of the beet and controlling the connections between the cutters and the height regulating means.

In testimony whereof, I have hereunto set my hand at Los Angeles, California this 13th day of November, 1912.

HOWARD E. WILLIAMS.

In presence of—
 ARTHUR P. KNIGHT,
 MARTHA M. LANGE.